UNITED STATES PATENT OFFICE.

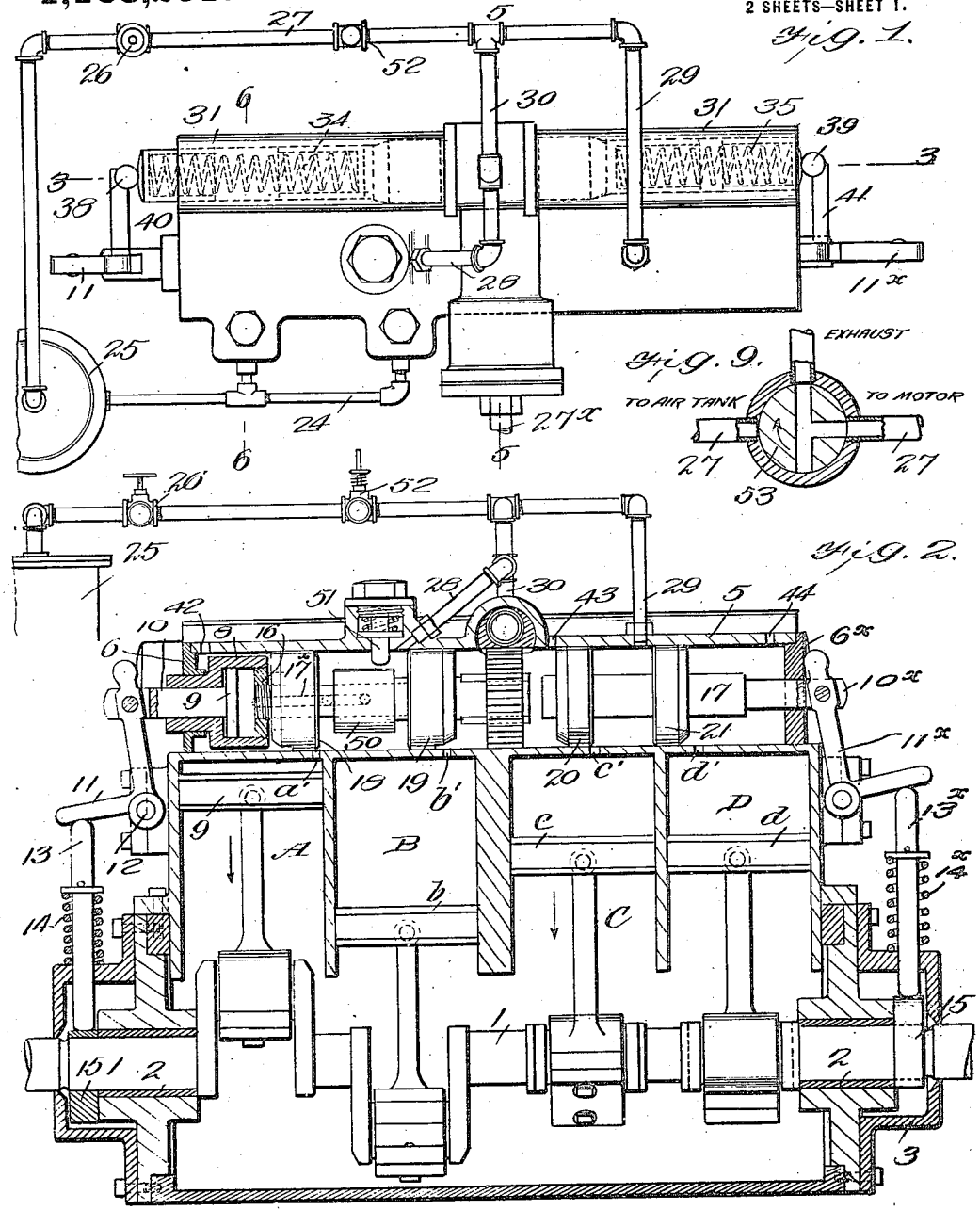

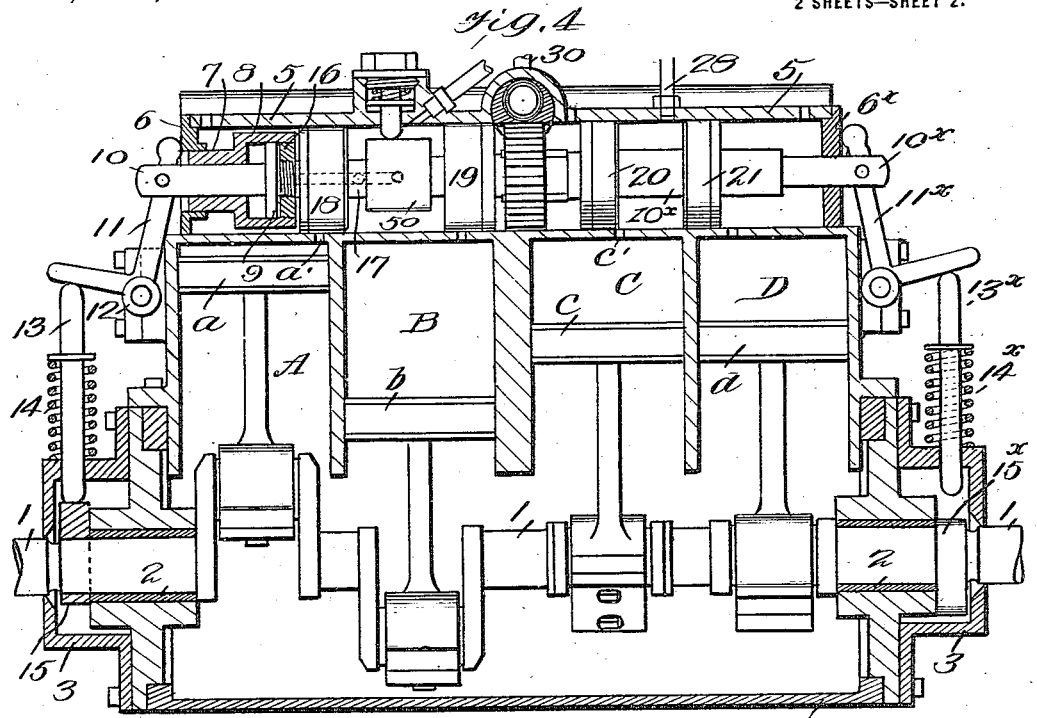
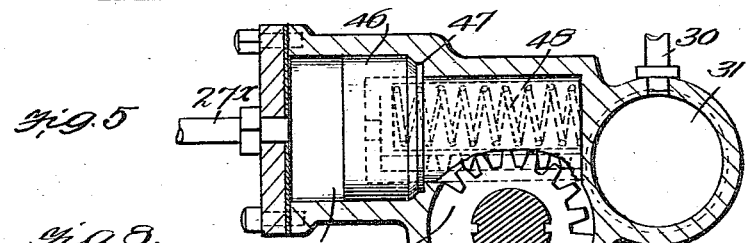
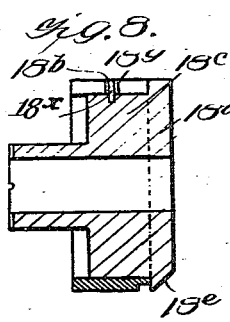
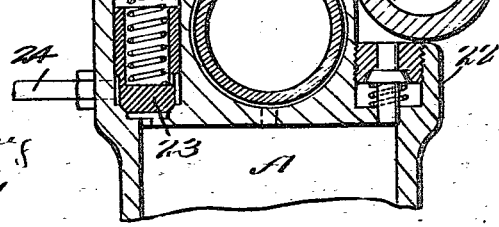

DAVID E. CROUSE AND CHARLES G. EIDSON, OF ANNAPOLIS, AND THOMAS DAVIS, OF BALTIMORE, MARYLAND.

AIR-COMPRESSOR MOTOR.

1,168,251.  Specification of Letters Patent.  Patented Jan. 11, 1916.

Application filed July 23, 1914. Serial No. 852,677.

*To all whom it may concern:*

Be it known that we, DAVID E. CROUSE and CHARLES G. EIDSON, citizens of the United States, and residents of Annapolis, in the county of Anne Arundel and State of Maryland, and THOMAS DAVIS, a citizen of the United States, and a resident of Baltimore, in the State of Maryland, have made certain new and useful Improvements in Air-Compressor Motors, of which the following is a specification.

Our invention relates to improvements in combined air compressors and motors, and it consists in the combinations, constructions, and arrangements herein described and claimed.

An object of our invention is to provide a device which may be run by any suitable power means, as for instance the shaft of an automobile engine and which will compress air into a tank or other suitable reservoir, and which may subsequently be used as a motor when the compressed air in the tank is admitted into the cylinders of the device.

A further object of our invention is to provide novel means for shifting certain parts so as to change from the air compressor to the motor or vice versa.

A further object of our invention is to provide means for positively holding certain valves to their seats when the device is used as an air compressor.

Other objects and advantages will appear in the following specification, and the novel features of the invention will be particularly pointed out in the appended claims.

Our invention is illustrated in the accompanying drawings forming part of this application in which similar reference characters indicate like parts in the several views, and in which, Figure 1 is a partial plan view of the device, Fig. 2 is a central longitudinal section through the device when the latter is being used as a motor, Fig. 3 is a section on the line 3—3 of Fig. 1, Fig. 4 is a view similar to Fig. 2 showing the parts in the position for using the device as an air compressor, Fig. 5 is an enlarged section on the line 5—5 of Fig. 1, Fig. 6 is an enlarged section on the line 6—6 of Fig. 1, Fig. 7 is a perspective view showing the construction of the piston valve, Fig. 8 is a diametrical section through the piston valve, and Fig. 9 is a detailed sectional view of a three-way valve, the same being a modified form.

In carrying out our invention we provide a main crank shaft 1 which is supported in suitable bearings 2 carried by the ends 3 of the crank case 4. As will be seen from Figs. 2 and 4 we provide four cylinders A, B, C and D having the pistons $a$, $b$, $c$ and $d$ respectively disposed therein, the pistons $a$ and $b$ being connected to the crank shaft 1 at 180° apart, while the pistons $c$ and $d$ are connected to the crank shaft 1 at 180° apart from each other and 90° from the pistons $a$ and $b$ respectively.

Each cylinder is provided with a port, such as those shown at $a'$, $b'$, $c'$ and $d'$ respectively. These ports serve both as inlet and exhaust ports when the device is to be used as a motor, but are closed when the device is to be used as an air compressor, as will be explained later.

Attached to the main cylinders is a valve casing 5 which is closed at its ends. One of these ends 6 is provided with an opening arranged to receive the reduced extension 7 of an auxiliary cylinder 8, and within the cylinder 8 is an auxiliary piston 9 whose stem 10 extends through the reduced extension 7 and is connected with a bell-crank lever 11 which is pivotally mounted at 12 and whose other arm is disposed in the path of a push rod 13 which is normally held in an upper position by means of a spring 14. This push rod extends into operative engagement with an eccentric 15 disposed on the shaft 1. The opposite end $6^x$ of the cylinder 5 has an opening through which a stem $10^x$ which is similar to the stem 10 extends. This is connected to a bell-crank lever $11^x$ which engages a push rod $13^x$ governed by a cam $15^x$ similar to the cam 15. The cams 15 and $15^x$ are 90° apart on the crank shaft so that when one of the push rods is up the other is half way down.

The cylinder 8 is closed by an end member 16 which is secured to a rod or shaft 17. Disposed on the shaft 17 are piston valves 18 and 19. A second shaft 10ˣ has an enlarged portion upon which are disposed piston valves 20 and 21 and a reduced portion which is operatively connected with the bell-crank lever 11ˣ. The piston valves 18, 19, 20 and 21 are designed to control the ports $a'$, $b'$, $c'$ and $d'$ respectively.

Referring now to Fig. 6 we have shown therein a section through the cylinder A from which it will be seen that the cylinder is provided with an inlet valve 22 and with an outlet check valve 23. The latter communicates by means of a pipe 24 with the air reservoir 25. The cylinder B is similarly provided with intake and outlet check valves, both the outlets of the cylinders A—B communicating with the tank 25 by the common pipe 24. The cylinders C and D are not provided with these valves, since the two cylinders A and B are entirely sufficient to compress air.

The pistons 18 and 19 are preferably of the form shown in Figs. 7 and 8, although pistons of another form might be used. From an inspection of Figs. 7 and 8 it will be seen that we provide a split ring 18ᵃ having a recess 18ᵇ on one edge thereof. This ring is designed to fit over a body portion 18ᶜ which is provided with a head 18ᵈ substantially flush with the outer edge of the ring. The head has a beveled portion 18ᵉ. The body portion 18ᶜ is provided with a pin 18ᵇ arranged to extend through a recessed portion 18ᵍ at the ends of the split ring. The piston when assembled has the appearance shown in Fig. 8. It may be secured to the shaft 17 in any suitable manner.

From the foregoing description of the various parts of the device the operation thereof may be readily understood.

Let us assume that the device is to be used as an air compressor. The crank shaft is turned. The movement of the cam 15 will cause the upward movement of the push rod 13 when the cam is on the upper side of the shaft, as shown in Fig. 4, thereby moving inwardly the piston 9. As soon as the piston reaches the head 16 it moves the latter together with the cylinder 8 and the rod 17, to which the head is connected, so as to bring the piston valves 18 and 19 over the ports $a'$ and $b'$. The piston valves 20 and 21 it will be noted are brought substantially into the position shown in Fig. 4, it being only necessary when the device is used as a compressor that the ports $a'$ and $b'$ of the cylinders A and B be closed. Further revolution of the crank shaft will result merely in the idle play of pistons $c$ and $d$, the piston valves 18 and 19 remaining over their ports. When the piston $a$ is descending it will draw in air through the inlet valve 22, see Fig. 6, and when it is ascending it will force the air out from the check valve 23 into the reservoir 25. The piston $b$ will likewise draw air in through its individual check valve and force it into the reservoir, so that the reservoir becomes charged by the movement of the pistons $a$ and $b$ in the cylinders A and B.

When now it is desired to use the device as an air motor the valve 26 in the pipe 27 is operated, thereby admitting air through the branch pipes 28 and 29, see Fig. 2, into the space between the piston valves 18 and 19 and between the piston valves 20 and 21. Part of this air pressure will pass by means of a by-pass 17ˣ in the shaft 17 into the space between the head 16 and the piston 9 in the auxiliary cylinder 8, thus causing the stem 10 to which the piston 9 is attached to move outwardly. This forms a cushion of air between the piston 9 and the head 16 of the auxiliary cylinder 8 thereby increasing the effective length of the stem 10 in the shaft 17 so as to control the valves 18 and 19 when the device is to be used as a motor, so that when the piston 9 is again moved inwardly it will cause the auxiliary cylinder 8 to move with it, and will thus move the shaft 17 bearing the piston valves.

The means for maintaining the piston stem 10 of the piston 9 in its outward position is shown in Figs. 1 and 3. In these figures it will be seen that when the valve 26 is operated air is admitted by means of a pipe 30 into a cylinder 31 carried by the frame of the device, see Figs. 1, 3 and 5, and forcing the plungers 32 and 33 in said cylinder apart against their seats. This tends to compress the springs 34 and 35 which thereupon force outwardly their respective plungers 36 and 37 against arms 38 and 39 respectively, that are secured to the pivot shafts 40 and 41 respectively. The springs 34 and 35 are so tensioned as to keep these bell-crank levers in their outer position. Now as the main crank shaft revolves the bell crank levers are engaged by the push rods 13 and 13ˣ, so as to shift the piston valves 18, 19 and 20, 21. In Fig. 2 the piston $a$ of the cylinder A is moving in the direction shown by the arrow, and air is coming in at the port $a'$. The piston $b$ of the cylinder B is moving so as to exhaust the air in the cylinder through the port $b'$. The piston $c$ of the cylinder C is taking in air through the port $c'$ while the piston $d$ of the cylinder D is exhausting from the port $d'$. The cylinder 5 is provided with exhaust ports 42, 43, and 44. It will be seen that the compressed air passes in to the cylinders A and B between the piston valves of the set of valves 18—19. The air passes into the cylinders C and D between the piston valves 20—21, while the exhaust in each instance takes place on the outside of these pistons, so that the ports $a'$, $b'$, $c'$, $d'$ act as inlet and exhaust ports.

It will be observed that the piston valves 18 and 19 have the cut-away portions 18ᵇ, see Fig. 7. When the device is used as a motor these valves are in the position shown in Fig. 2 in which it will be observed that the cut away portion now leaves a valve of comparatively small width, or of just such size as to insure avoidance of "lap", and when the device is being used as an air compressor the full width of the valve is used, as shown in Fig. 4. This necessitates the rotation of the valve and it is accomplished in the following manner: As will be seen from Fig. 5 there is a second auxiliary cylinder 45 which is provided with a plunger 46. When air is first admitted through the pipe 27ˣ this plunger is forced down upon a seat 47 and presses a spring 48 which is contained within the plunger stem. The lower part of the stem is provided with a rack arranged to engage a segmental gear 49 which is feathered to the shaft 17 so as to cause rotation of the latter, the shaft 17, however, being arranged to slide through the gear longitudinally of its axis. When pressure is admitted through the pipe 27 therefore, the piston valves 18 and 19 are turned so as to being them into the position shown in Fig. 2, thus exposing the small width of the piston valve to that part of the cylinder containing the ports $a'$ and $b'$.

We have found by experience that the pressure inside the cylinders A and B will tend to raise the valves so as to cause leakage when the device is used as a compressor and to lock the valves down against this pressure we provide a member 50 which is carried by the shaft 17 but which is eccentric thereof. This is pressed upon by a spring-actuated plunger 51 whose tension may be regulated by a screw plug. When the device is to be used as a compressor the member 50 is turned in such a position that it will lock the piston valves down on the ports, it being understood as explained, that these valves do not move when the device is being used as an air compressor. When the device is to be used as an air compressor, a push valve 52 is operated to relieve the air pressure between the piston valves 18 and 19, thus permitting the air in the cylinder 8 to escape through the by-pass 17ˣ, and permitting the piston 9 in the cylinder 8 to move up near the head 16, as shown in Fig. 4. The release of the air from the pipe 27 permits the plungers 32 and 33 see Fig. 3, to approach each other under the action of the springs 34 and 35. This permits the bell crank levers 11 and 11ˣ to assume positions in which they will not be operated by the cams. When the air is released from the cylinder 45 the spring 48 will rotate the segmental gear 49 so as to bring the piston valves 18 and 19 into the position shown in Fig. 4 with the wide part of the valves over the ports $a'$ and $b'$.

From the foregoing description it will be seen that the primary function of the springs 34 and 35 is to hold the bell-crank levers 11 and 11ˣ in such a position that when the device is being used as an air motor the piston valves will be operated by the movements of the cam rods 13 and 13ˣ. When the air is relieved in the cylinder 31 the spring tension is withdrawn from the bell-crank levers by the retraction of the pistons 32 and 33, as heretofore explained.

Instead of using the two valves 26 and 52 we may use a single three-way valve like that shown in Fig. 9. In this figure it will be seen that the valve 53 has passages which may establish communication either with the pipe 27 and the exhaust, as shown in Fig. 9, or when rotated indirectly, as shown by the curved arrow, that portion of the pipe 27 leading to the pressure reservoir may be connected with the other portion of the pipe 27 while the exhaust is cut off. When the device is to be used as an automobile starter the single three-way valve is preferable, since it may be connected to a foot lever (not shown) to bring the device to operate as a motor for starting the engine where on the release of the valve it will be returned to its normal position shown in Fig. 9, thereby permitting the device to operate as an air compressor.

We claim:—

1. In a combined air motor and compressor, a plurality of cylinders each provided with an inlet check valve and an outlet check valve and each having a single port serving as an inlet port and an outlet port, a valve casing common to all of said cylinders, an individual piston valve in said valve casing for each of said ports, means for shifting said piston valves from one side of its individual port to the other when the device is being used as a motor, means for shifting the piston valves to cover certain of said ports when the device is being used as an air compressor, and automatic means for locking the piston valves which cover the ports against the pressure within the cylinders.

2. In a combined air motor and compressor, a plurality of cylinders each provided with an inlet check valve and an outlet check valve, and each cylinder having a single port serving as an inlet port and an outlet port, a valve casing common to all of said cylinders, a shaft disposed therein, a plurality of piston valves carried by said shaft, means for moving the shaft longitudinally of its axis so as to bring the valves into position to cover the ports when the device is used as an air compressor, an eccentric cam carried by said shaft, a spring pressed plunger arranged to engage said cam, and automatic means for rotating said shaft to bring the cam in position to lock the piston valves against pressure within the cylinder.

3. In a combined air motor and compressor, a plurality of cylinders each provided with an inlet check valve and an outlet check valve, and each cylinder having a single port serving as an inlet port and an outlet port, a valve casing common to all of said cylinders, a shaft disposed therein, a plurality of piston valves carried by said shaft, means for moving the shaft longitudinally of its axis so as to bring the valves into position to cover the ports when the device is used as an air compressor, an eccentric cam carried by said shaft, a spring pressed plunger arranged to engage said cam, automatic means for rotating said shaft to bring the cam in position to lock the piston valves against pressure within the cylinder, said last named means comprising a segmental gear feathered to the shaft so as to rotate the shaft when the gear is rotated, but to permit the longitudinal movement of the shaft on its axis, and pneumatic means for operating the gear.

4. In a combined air motor and compressor, a plurality of cylinders each provided with an inlet check valve and an outlet check valve, and each cylinder having a single port serving as an inlet port and an outlet port, a valve casing common to all of said cylinders, a shaft disposed therein, a plurality of piston valves carried by said shaft, means for moving the shaft longitudinally of its axis so as to bring the valves into position to cover the ports when the device is used as an air compressor, an eccentric cam carried by said shaft, a spring pressed plunger arranged to engage said cam, automatic means for rotating said shaft to bring the cam in position to lock the piston valves against pressure within the cylinder, said last named means comprising a segmental gear feathered to the shaft so as to rotate the shaft when the gear is rotated, but to permit the longitudinal movement of the shaft on its axis, an auxiliary air cylinder, a spring pressed piston disposed within said air cylinder and having an integral rack arranged to engage the gear, the admission of air into the auxiliary cylinder serving to rotate the gear in one direction and the withdrawal of air causing the rotation of the gear in the other direction through the expansion of the spring.

5. In a combined air motor and compressor, a plurality of cylinders each provided with an inlet check valve and an outlet check valve, each cylinder having a single port which serves as an inlet port and an outlet port, a valve casing common to all of said cylinders, a shaft disposed in said valve casing, a plurality of piston valves carried by said shaft, said piston valves each having a reduced peripheral portion, and automatic means for bringing said reduced peripheral portion in position to pass over said ports when the device is being used as a motor.

6. In a combined air motor and compressor, a plurality of cylinders each provided with an inlet check valve and an outlet check valve, each cylinder having a single port which serves as an inlet port and an outlet port, a valve casing common to all of said cylinders, a shaft disposed in said valve casing, a plurality of piston valves carried by said shaft, said piston valves each having a reduced peripheral portion, and automatic means for rotating said piston valves to bring the reduced portion into position to move past the ports when the device is being used as a motor and for reversely rotating the piston valves so as to bring the reduced portions out of registration with the ports when the device is being used as an air compressor.

7. In a combined air motor and compressor, a plurality of cylinders each provided with an inlet check valve and an outlet check valve and each having a single port serving as an inlet port and an outlet port, a valve casing common to all of said cylinders, a crank shaft, an auxiliary shaft in said valve casing, a bell-crank lever operatively connected with the auxiliary shaft in said valve casing, means operated by the crank shaft for moving the bell-crank lever, spring means for exerting tension on the bell-crank lever, pneumatic means for automatically applying the spring tension on the bell-crank lever, said pneumatic means comprising a cylinder, a spring-pressed plunger operatively connected with said bell-crank lever, and a piston arranged to move under air pressure so as to cause the compression of the spring.

8. In a combined air motor and compressor, a plurality of cylinders, each provided with an inlet check valve and an outlet check valve and each cylinder having a single port serving as an inlet port and an outlet port, a valve casing common to all of said cylinders, piston valves in said valve casing for controlling said ports, means for shifting said piston valves over said ports when the device is used as a motor, the shutting off of the motive fluid serving to permit the valve actuating device to move certain of the valves so as to cover certain of the ports, and means for automatically locking the valves covering the ports against pressure from within the cylinders.

9. In a combined air motor and compressor, a plurality of cylinders each provided with an inlet check valve and an outlet check valve and each cylinder having a single port serving as an inlet port and an outlet port, a valve casing common to said cylinders, a crank shaft, an auxiliary shaft in said valve casing, a bell-crank lever operatively connected with the shaft in said valve casing, means operated by the crank shaft for moving the bell-crank lever, and pneumatically controlled spring means for exerting pressure on the bell-crank lever.

DAVID E. CROUSE.
CHAS. G. EIDSON.
THOMAS DAVIS.

Witnesses:
  J. W. THURMAN,
  G. S. STOUT.